US010140563B2

(12) United States Patent
Lau et al.

(10) Patent No.: US 10,140,563 B2
(45) Date of Patent: Nov. 27, 2018

(54) INFORMATION BEARING DEVICE

(71) Applicant: INFOTOO INTERNATIONAL LIMITED, Kowloon, Hong Kong (CN)

(72) Inventors: Tak Wai Lau, Hong Kong (CN); Wing Hong Lam, Hong Kong (CN)

(73) Assignee: INFOTOO INTERNATIONAL LIMITED, Kowloon (HK)

( * ) Notice: Subject to any disclaimer, the term of this patent is extended or adjusted under 35 U.S.C. 154(b) by 0 days.

(21) Appl. No.: 15/566,486

(22) PCT Filed: Apr. 18, 2016

(86) PCT No.: PCT/IB2016/052197
§ 371 (c)(1),
(2) Date: Oct. 13, 2017

(87) PCT Pub. No.: WO2016/166739
PCT Pub. Date: Oct. 20, 2016

(65) Prior Publication Data
US 2018/0137397 A1    May 17, 2018

(30) Foreign Application Priority Data
Apr. 16, 2015    (HK) .................................. 15103725.9

(51) Int. Cl.
*G06K 19/06*    (2006.01)
(52) U.S. Cl.
CPC . *G06K 19/06037* (2013.01); *G06K 19/06056* (2013.01)

(58) Field of Classification Search
CPC .................. G06K 19/06037; G06K 19/06056
See application file for complete search history.

(56) References Cited

U.S. PATENT DOCUMENTS

2013/0148168 A1    6/2013 Berual et al.

OTHER PUBLICATIONS

International Search Report for PCT/IB2016/052197 dated Aug. 29, 2016.
Hung-Kuo Chu et al., "Halftone QR Coders", ACM Transactions on Graphics, vol. 32, No. 6, Nov. 30, 2013, pp. 217.1-217.8.
(Continued)

*Primary Examiner* — Sonji N Johnson
(74) *Attorney, Agent, or Firm* — Nixon Peabody LLP; Jeffrey L. Costellia

(57) ABSTRACT

A composite information bearing device comprising a plurality of data units forming a data bearing device and an ensemble of pattern defining elements defining a data embedding spread pattern, wherein each data unit is in one of a plurality of digital states and at least some of the data units of a digital state are defined by the pattern defining elements, wherein the pattern defining elements are distributed following a spatial distribution rule, and the spatial distribution rule defines characteristic values of the spread pattern in spatial domain which are continuous values spread between a maximum value and a minimum value, and wherein the spatial distribution of the pattern defining elements of the ensemble follows the spatial distribution rule to the extent where the characteristic values are either above or below a selection threshold value which is a value between the maximum value and the minimum value.

20 Claims, 5 Drawing Sheets

(56) References Cited

OTHER PUBLICATIONS

Figure 3A:
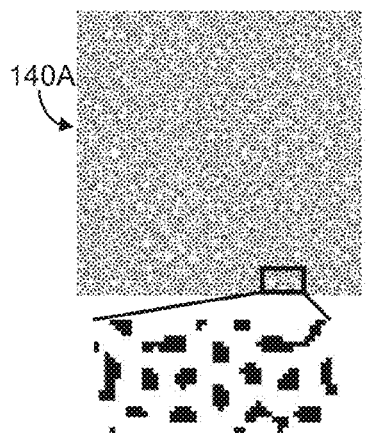

K. Ganesan et al., Multiple Binary Images Watermarking in Spatial and Frequency Domains, Signal & Image Processing: An International Journal (SIPIJ) vol. 1, No. 2, Dec. 31, 2010, pp. 148-159.
Gonzalo J. Garateguy et al., "QR Images: Optimized Image Embedding in QR Codes", IEEE Transactions on Image Processing vol. 23, No. 7, Jul. 31, 2014, pp. 1-11.

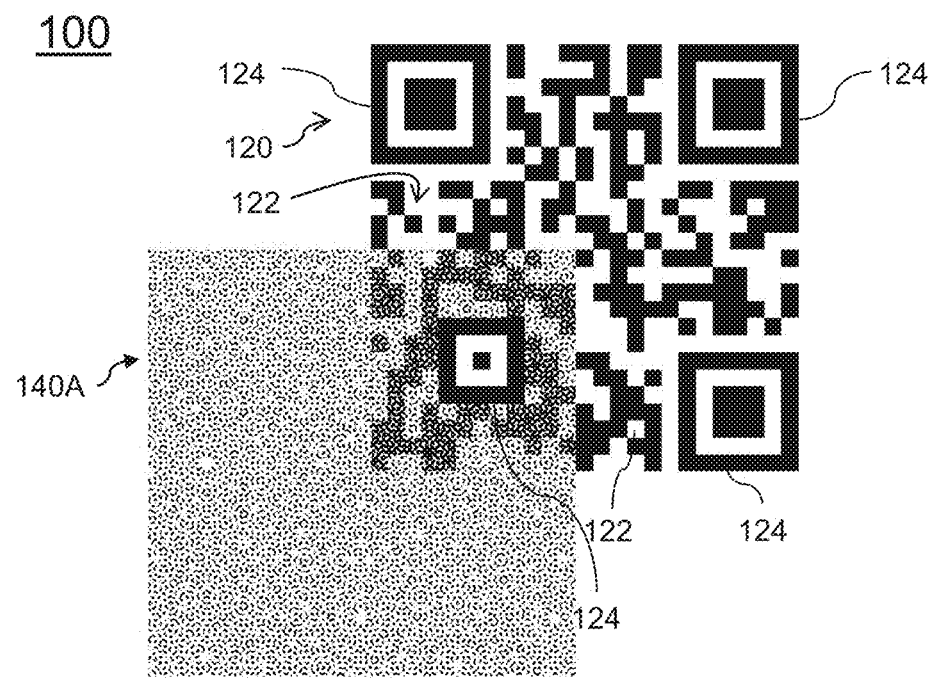
Fig. 1
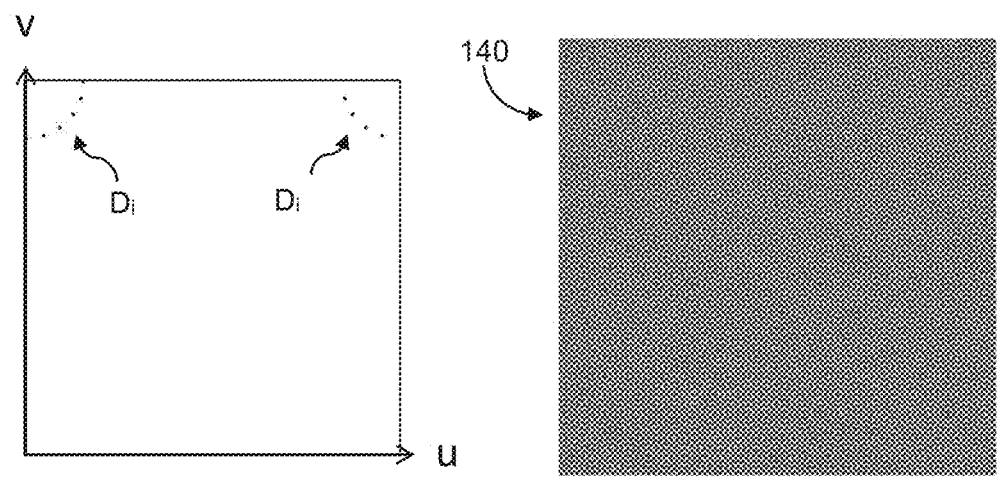
Fig. 2
Fig. 2A

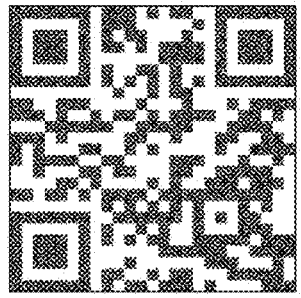
202
Fig. 5A1
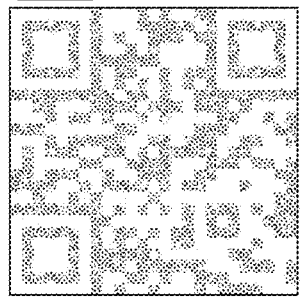
204
Fig. 5A2
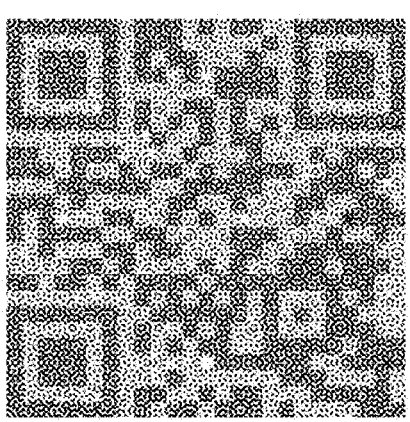
200
Fig. 5A
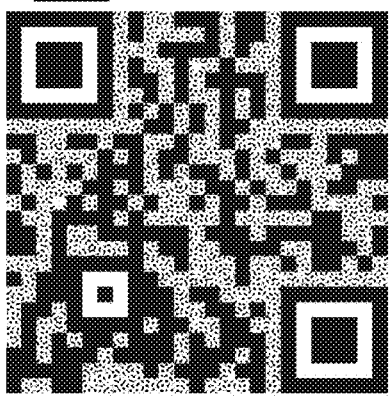
400
Fig. 5C
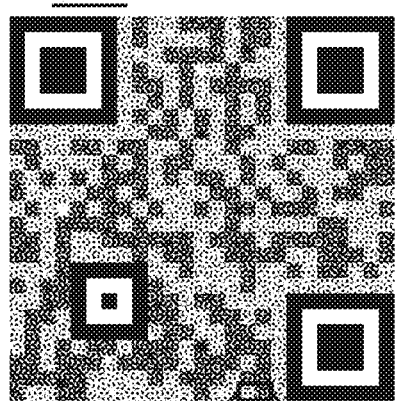
300
Fig. 5B
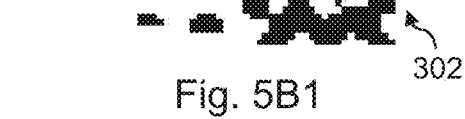
304    302
Fig. 5B1

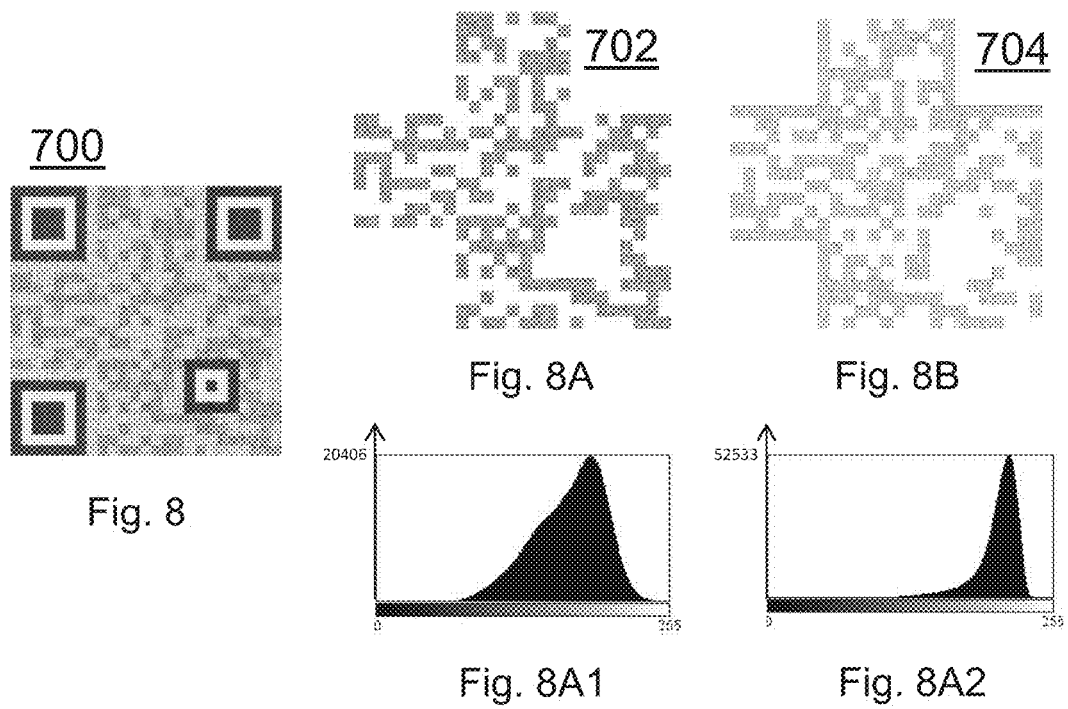
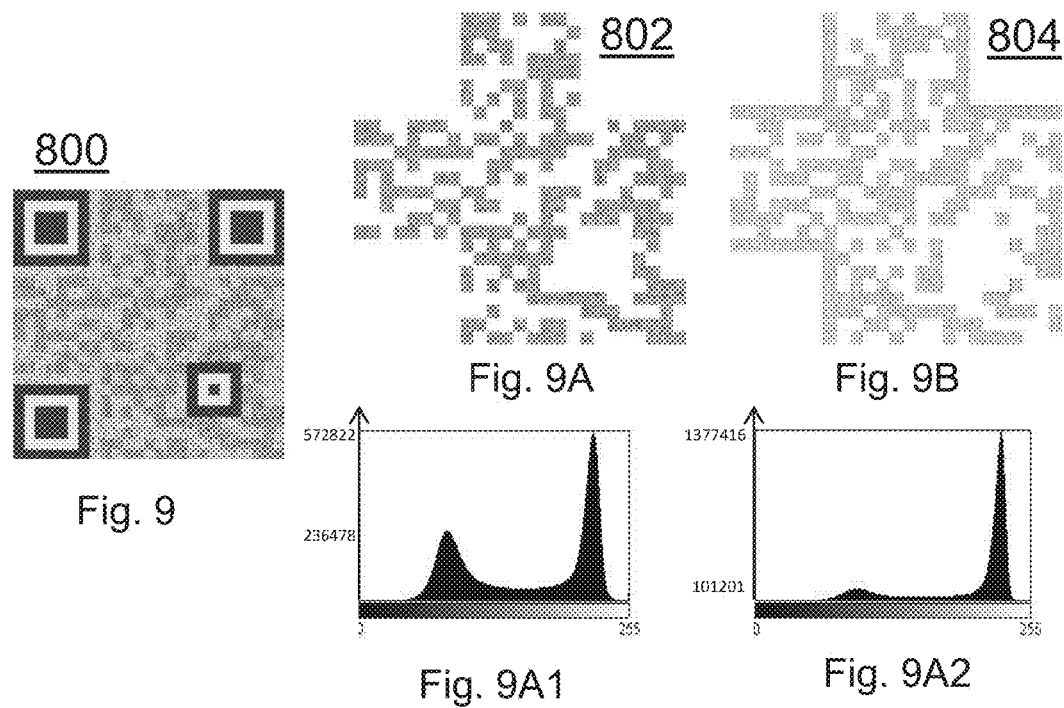

INFORMATION BEARING DEVICE

FIELD

The present disclosure relates to composite information bearing devices and methods of making same.

BACKGROUND

Data bearing devices comprising a covertly coded data embedded pattern are widely used as in authentication, identification, tracking, telecommunications, verification, and other applications. For example, information bearing devices such as digital watermarks are frequently incorporated in documents such as identification documents, certificates, authorization permits; articles such as product tags and labels and valuable articles such as credit cards, currency notes and the like. In many applications, the data embedded pattern is usually formed as a background image pattern, as a foreground image pattern or as a mixture of both. Data bearing devices comprising overtly coded data units are also widely used as information sources. Barcodes and QR (RTM) codes are common example of this type of data devices.

A composite information bearing device comprising a first data bearing device formed of overtly coded data units and a second bearing device formed of a covertly coded data embedded pattern which at least partially overlap to form a overlapping data bearing portion is useful. Overlapping of data bearing portions results in an increase in data density as well as an increase in difficulty of copying and/or data recovery.

DISCLOSURE

A composite information bearing device comprising a plurality of data units, the plurality of data units being arranged to define a first data bearing device representing a first set of data, wherein each of the data units is formed into one of a plurality of discrete states to represent one of a corresponding plurality of digital states including at least a first digital state and a second digital state, wherein at least some of the data units of one of the first digital state and/or the second digital state are defined by an ensemble of pattern defining elements, and the number of pattern defining elements forming the ensemble is substantially higher than the number of data units defined by the ensemble; wherein the pattern defining elements of the ensemble are distributed to form a first data embedding pattern, and the first data embedding pattern corresponds to a second set of data; wherein the second set of data correlates to a spread pattern which follows a spatial distribution rule, and the spatial distribution rule defines characteristic values of the spread pattern in spatial domain and have continuous values spread between a maximum value and a minimum value is disclosed. The spatial distribution of the pattern defining elements of the ensemble may follow the spatial distribution rule to the extent where the characteristic values are either above or below a selection threshold value, the selection threshold value being a value between the maximum value and the minimum value.

In some embodiments, a plurality of data units of a digital state is formed by an aggregate of pattern defining elements, and the aggregate has a first density of the pattern defining elements, the first density correlating to the selection threshold value of the pattern defining elements forming the first aggregate.

The density of the pattern defining elements is a ratio between the area covered by the pattern defining elements and the area covered by the data units. The density of the pattern defining elements within a data unit is likewise the ratio between the area covered by the pattern defining elements within the data unit and the area covered by the data unit. The density of the pattern defining elements would be equal to or substantial equal to a ratio between the number of pattern defining elements and the number of total pixels in the aggregate.

FIGURES

Figure 3B:
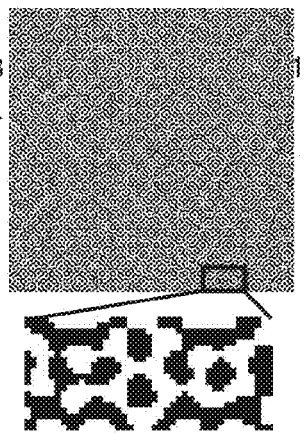
Figure 3C:
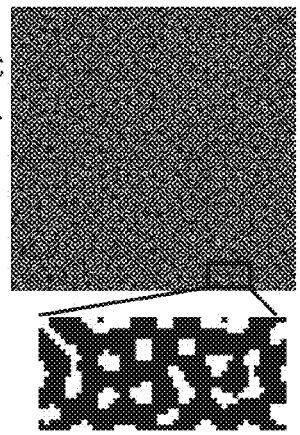
Figure 4A:
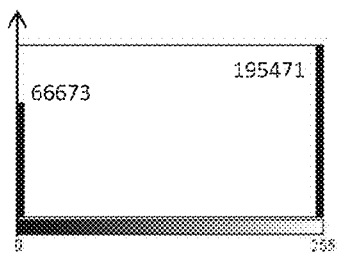
Figure 4B:
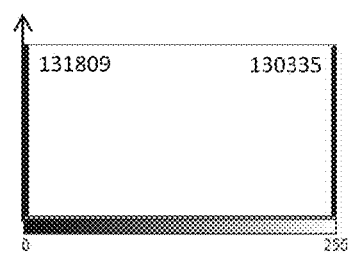
Figure 4C:
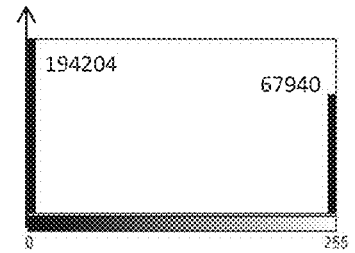
Figure 4C:
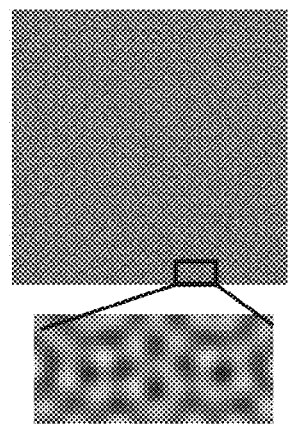
Figure 2B:
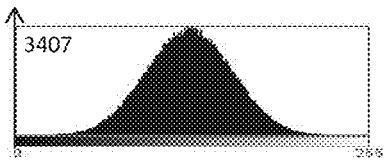
Figure 6:
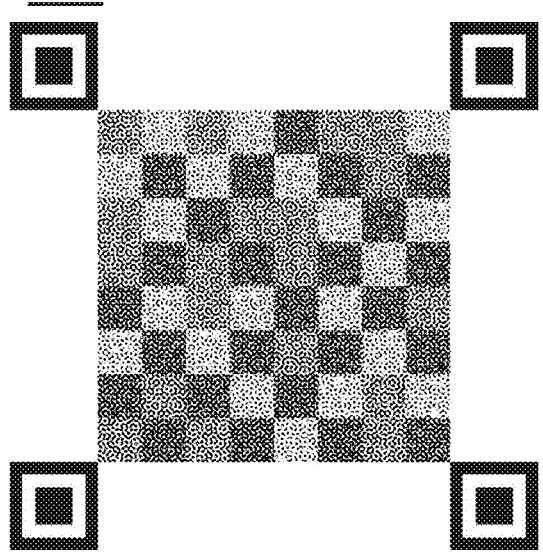
Figure 7:
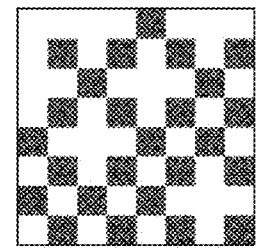
Figure 7:
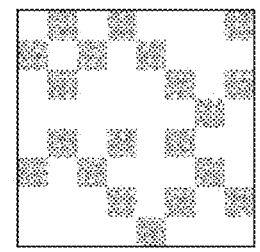
Figure 7:
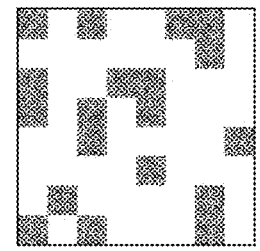
Figure 7:
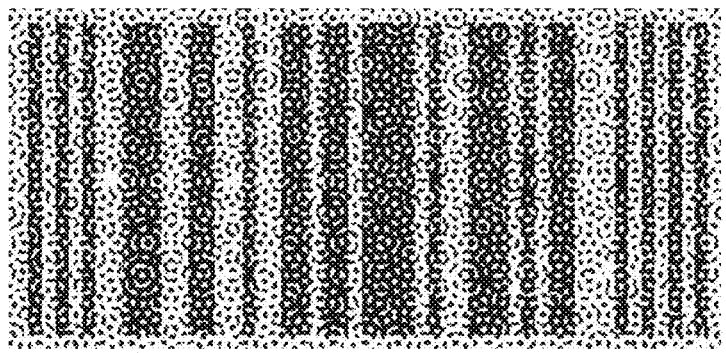

The present disclosure will be described by way of example and with reference to the accompanying figures, in which:

FIG. 1 depicts an example composite information bearing device according to the present disclosure, FIG. 2 is a graphical representation of a set of example discrete data distributed in data domain, FIG. 2A is an example data embedding pattern generated by a data transform function operating on the set of example discrete data of FIG. 2, FIG. 2B shows the data embedding pattern of FIG. 2A and an enlargement of the portion delineated by a rectangular box, FIG. 2B1 is a diagram showing a distribution of number of pixels versus example characteristic values of the data embedding pattern of FIG. 2A, FIGS. 3A, 3B and 3C show example data embedding patterns corresponding to the set of example discrete data of FIG. 2 according to the present disclosure (the rectangular box for reference only and not forming part of the actual pattern), FIGS. 4A, 4B and 4C show respectively the data embedding pattern of FIGS. 3A, 3B, and 3C, and an enlargement of the portion delineated by a rectangular box, FIGS. 4A1, 4B1 and 4C1 are diagrams showing a distribution of number of pixels versus example characteristic values of the data embedding patterns of FIGS. 3A, 3B, and 3C respectively, FIG. 5A shows an example composite information bearing device 200 according to the present disclosure, FIG. 5A1 shows the dark data portion of a first data bearing device of FIG. 5, FIG. 5A2 shows the light data portion of a first data bearing device of FIG. 5, FIG. 5B shows an example composite information bearing device 300 according to the present disclosure, FIG. 5B1 shows an example dark data unit and an example light data unit of the composite information bearing device of FIG. 5B, FIG. 5C shows an example composite information bearing device 400 according to the present disclosure, FIG. 6 shows an example composite information bearing device 500 according to the present disclosure, FIG. 6A1 shows the darkest data portion of the first data bearing device of FIG. 6, FIG. 6A2 shows the intermediate-darkness data portion of a first data bearing device of FIG. 5, FIG. 6A3 shows the lightest data portion of a first data bearing device of FIG. 6, FIG. 7 shows an example composite information bearing device 600 according to the present disclosure, FIG. 8 depicts an example printed version of a composite information bearing device according to the present disclosure, FIG. 8A shows the dark portion of the composite information bearing device of FIG. 8, FIG. 8B shows the light portion of the composite information bearing device of FIG. 8, FIGS. 8A1 and 8A2 are respectively histograms showing pixel distributions of the portions of FIGS. 8A and 8B, FIG. 9 depicts an example printed version of a composite information bearing device according to the present disclosure, FIG. 9A shows the dark portion of the composite information bearing device of FIG. 9, FIG. 9B shows the light portion of the composite information bearing device of FIG. 9, and FIGS. 9A1 and 9A2 are respectively histograms showing pixel distributions of the portions of FIGS. 9A and 9B.

DESCRIPTION

An example composite information bearing device 100 depicted in FIG. 1 comprises a first data bearing device 120 and a second data bearing device 140A which are in partial overlap. The first data bearing device 120 comprises a plurality of data units 122 and the data units 122 are distributed in a two-dimensional matrix comprising P rows and Q columns, wherein P and Q are integers. Each of the data unit has a square shape and the data units have identical shapes and dimensions. The data units are digitally coded into a first data state ("first state" in short) or a second data state ("second state" in short). In the non-overlapping region, the data units are either coded as a white unit ("W") to represent the first state or a black unit ("B") to represent the second state. In the overlapping region, the data units are either coded as a light unit ("L") to represent the first state or a dark unit ("D") to represent the second state. While the first data bearing device 120 has a square shape having side dimensions corresponding to P=25 rows and Q=25 columns of data units, not all of the area is occupied by data units and some of the area is occupied by an alignment device or reference device.

The alignment device comprises four alignment members 124 each comprising an outer black square frame, an inner black square bit and an intermediate white frame separating the outside black square frame and the inner black square bit. Three of the alignment members are outside the overlapping region and are distributed at corners of a square delimiting the first data bearing device 120, and a fourth alignment member is inside the overlapping region and occupying an area of 25 data units. While the first data bearing device 120 has P=Q=25, P and/or Q can have other integer values such as 21, 29, 33, 57, 117, 177, or other values adopted by for example what is known as a QR™ code from time to time without loss of generality. The example first data bearing device 120 has example side dimensions of 1 cm width (in x-direction) and a 1 cm high (in y-direction), although the first data bearing device 120 can be scaled to any desirable dimensions when in a printed form or a display form without loss of generality.

As an example, the data units in the first row read [W, B, W, W, B, B, B, W, B, B, W] to represent digital data of [0, 1, 0, 0, 1, 1, 1, 0, 1, 1, 0] or [1, 0, 1, 1, 0, 0, 0, 1, 0, 0, 1], where 0 and 1 are discrete digital states. Similarly, the data units in the last row are [D, L, L, D, D, L, L, L, L, L, L, L, B, W, W, W, B, W] to represent digital data of [1, 0, 0, 1, 1, 0, 0, 0, 0, 0, 0, 1, 0, 0, 0, 1, 0] or [0, 1, 1, 0, 0, 1, 1, 1, 1, 1, 1, 1, 0, 1, 1, 1, 0, 1], where both L and W represent the same digital state, say a first digital state, and both D and B represent another same digital state, say, a second digital state. Alternatively, L, W, B and D may represent 4 different digital states without loss of generality.

The second data bearing device 140A is a data embedded spatial pattern which is designed to correlate to an example set of discrete data comprising:

{(D1), (D2), (D3), (D4), (D5), (D6), (D7), (D8), (D9), (D10)}, where each one of Di, where i=1, 2, . . . , 10, is a data having a discrete value (ui, vi) and arbitrary values of the data are set out below for example:

$$\left\{ \begin{array}{l} (D1): (0, 433); (D2): (24, 437); (D3): (488, 437); (D4): (46, 448); (D5): (466, 488); \\ (D6): (64, 466); (D7): (488, 466); (D8): (75, 488); (D9): (437, 488); (D10): (79, 511) \end{array} \right\}$$

The example set of discrete data is graphically shown in the data domain (u, v) in FIG. 2 and can be represented by the rule or expression below:

$$F(u, v) = \begin{cases} 1, \text{ if } (u, v) = \{(D1), (D2), (D3), (D4), (D5), (D6), (D7), (D8), (D9), (D10)\} \\ 0, \text{ otherwise} \end{cases}.$$

The value of "1" in the above expression of F(u, v) is used to indicate presence of data Di at the coordinates (u, v) while the value of "0" is used to represent absence of data thereat. In the graphical representation of FIG. 2, the value of "1" is represented by a black bit on a white background and the white background represents the value "0".

In general, a set of discrete data (F(u, v)) comprising one or a plurality of discrete data has a corresponding counterpart f(x, y) in the spatial domain (x, y) which is descriptive, representative or characteristic of a data embedding pattern such as a digital watermark or a steganographically coded image pattern. An example characteristic expression of an example corresponding counterpart which can operate to embed the data (F(u, v) in to a covertly coded data embedding pattern is set out below:

$$f(x, y) = \text{Re}\left[\sum_{u=0}^{N-1} \sum_{v=0}^{M-1} F(u, v)\exp\left(\frac{j2\pi ux}{N}\right)\exp\left(\frac{j2\pi vy}{M}\right)\right],$$

where f(x, y) is the value of the characteristic expression at coordinates (x, y) and 'Re' denotes the real part.

The characteristic expression f(x, y) is an example rule of spatial distribution correlating the counterparts F(u, v) and f(x, y) and governing the properties of pattern defining elements that form the pattern 140A.

For a digitised pattern defined by M×N pixels, where a pixel is a smallest or a basic unit of the pattern, M, N are integers, and the coordinates (x, y) have the discrete values of x=0 to N−1, y=0 to M−1, the characteristic value f(x, y) of a pixel at the coordinates (x, y) would be a value at a maximum value (fmax), at a minimum (fmax) or therebetween.

As the discrete data F(u, v) is embedded in the characteristic expression, it follows that the discrete data F(u, v) is also embedded in the covertly coded data embedding pattern since the characteristic expression is descriptive, representative or characteristic of the data embedding pattern.

The characteristic expression f(x, y) can be processed by a computational device to generate a spatial pattern having M×N pixels once the data F(u, v) and M, N are given. Conversely, the data (F(u, v)) can be generated or recovered by a computational device when the spatial pattern and M, N are provided. The characteristic expression f(x, y) has the effect of a data transform function since it is operable to transform, convert and/or spread a set of discrete data into a spatial pattern spread in the M×N pixels. The spatial pattern has the effect of a covertly coded data embedding pattern since the embedded data can be retrieved, recovered or generated by a computational device by reverse operation of the data transform function when the spatial pattern is provided, but is not readily readable by naked eyes.

An example covertly coded data embedding pattern 140 depicted in FIG. 2A is generated by a computational device by performing data transform operations on the data F(u, v) using the data transform function T:

$$f(x, y) = T\{F(u, v)\} = \text{RE}\left[\sum_{u=0}^{N-1}\sum_{v=0}^{M-1}\{F(u, v)\}\exp\left(\frac{j2\pi ux}{N}\right)\exp\left(\frac{j2\pi vy}{M}\right)\right],$$

The data transform function (T) defines a correlation between the data F(u, v) with f(x, y), and f(x, y) defines the magnitude or characteristic value f(x, y) at all locations defined by the coordinates (x, y). Therefore, the data transform function has the effect of a spatial distribution rule which defines the spatial properties in a space defined by the coordinates (x, y), where x=0 to N−1, y=0 to M−1, or equivalent. Where M×N is substantially larger than the number of discrete data contained in the data set F(u, v), the data transform function has the effect of spreading the data set F(u, v) and each individual discrete data into a spread spatial pattern comprising M×N pattern units which are scattered or distributed in the spatial domain upon performing data conversion operations on the data set F(u, v). The magnitude of the characteristic value f(x, y) at a spatial unit having the coordinates (x, y) determines at least one characteristic property of the spatial unit. As the identity or value of the data is covertly embedded in the spatial distribution rule, a pattern having spatial distribution properties corresponding to the spatial distribution rule can be considered an 'alter ego' or 'hidden ego' of the data set.

A data embedding pattern generated according to this data transform function is a spread pattern since the pattern defining elements are scattered or spread across the entire span or area of the M×N pixels of the spatial pattern 140. The spreading effect is due to contribution of the double exponential portion of the rule of spatial distribution. The continuous nature of the spreading function, which comprises a double exponential function in the present example, means that the values of the characteristic expression f(x, y) can be at a maximum value (fmax), at a minimum (fmax), or at a value which is one of many values between the maximum or minimum values. The example spatial pattern 140 is a result of combining or superimposing a plurality of spatial patterns each of which is due to spreading transform of an individual data Di using the data transform function.

When processing a given covertly coded spatial pattern to obtain or recover the covertly embedded data, the computational device will perform conversion operations which are a reversal of the transformation process that transforms or converts a discrete data into a spatial pattern. When performing the reversal transformation, the computational device will execute stored instructions to process parameters including the values of the pattern defining elements and corresponding locations of the pattern defining elements, (that is, pixel coordinates), and then to determine or recover the embedded data.

The characteristic expression f(x, y) as an example rule of spatial distribution is in the form of a Fourier counterpart of the set of data F(u, v). Fourier counterpart is used as an example for data transformation operations because Fourier transform has the effect of spreading a discrete data into a pattern which is defined by a plurality of pattern defining elements. The discrete data would be recoverable by performing reverse Fourier transform on the spatial pattern. Upon performance of the reverse transform, the spatial distribution properties, characteristics, and/or relationship are processed to recover the discrete data. This reversal process is opposite to the spreading process or the spreading transform and will be referred to as a 'merging' transform or a 'discretization' process as a convenient short hand. The specific correspondence between a discrete pattern and its characteristic spatial pattern is advantageous for coding of data into an image, a figure or a pattern.

While Fourier is a useful example of data transform counterparts, it should be appreciated that other transformation functions, for example Bessel, Cosine, etc., that have a data spreading effect and specific counterpart correspondence properties are also useful for the present applications. Use of Bessel functions to form spread data embedded patterns has been described in WO2015063677A1.

For example, a discrete data having a single frequency value in the Fourier domain has a characteristic counterpart spread pattern in the spatial domain, and the characteristic counterpart spread pattern comprises pattern defining elements having a single repetition frequency in the spatial domain. For a set of discrete data comprising a plurality of discrete data, the characteristic counterpart spread pattern comprises pattern defining elements which have repetition frequencies in the spatial domain that are due to the individual discrete data.

For a spatial pattern having M×N pixels, the spatial frequency ω(u, v) for a data (u, v) is given by the relationship below:

$$\omega(u, v) = \sqrt{\left(u - N*H\left(u - \frac{N}{2}\right)\right)^2 + \left(v - M*H\left(v - \frac{M}{2}\right)\right)^2},$$

where H is the Heaviside step function.

If the spatial pattern is printed or displayed in an area of L cm×L cm, the spatial frequency can be expressed in LPI units of 2.54 ω/L lines-per-inch ("LPI"). In the example of FIG. 1 where the spatial pattern 140A has a size of 1 cm×1 cm, the spatial repetition frequency of the data D2, which has an example data value (u, v)=(24,437), would have a spatial frequency of about 198 LPI, as calculated using the relationship below:

$$\omega(24, 437) = \sqrt{\left(24 - 512 * H\left(24 - \frac{512}{2}\right)\right)^2 + \left(437 - 512 * H\left(437 - \frac{512}{2}\right)\right)^2} \approx 78.$$

A ω value of 78 corresponds to 198 LPI by the conversion relationship: LPI=2.54×ω/L.

In example or typical applications, the spatial repetition frequency would be above 150 LPI or above, and spatial repetition frequencies at or above 175 LPI, 250 LPI, 300 LPI, 350 LPI, 400 LPI, 450 LPI, 500 LPI, 550 LPI, or 600 LPI are particularly suitable for applications requiring a higher resolution. On the other hand, the density of the data units of the first data bearing device, also expressed in a spatial repetition frequency in LPI unit, would be substantially lower, for example, at or near 35%, 30%, 25%, 20%, 15%, 10%, 5%, 1%, 0.1%, 0.05%, 0.01% of the spatial repetition frequency of the data embedding pattern or lower.

The characteristic expression f(x, y) determines the characteristic value of a pixel at a location (x, y) and the characteristic values of all the pixels of the spatial pattern are variable and can be a value at a maximum value (fmax), at a minimum (fmax) or between a maximum value (fmax) and a minimum value (fmin). The continuous nature of the characteristic expression f(x, y), for example, due to the exponential function, means that the characteristic values are continuously or continuously varying throughout the spatial pattern 140, and the analogue nature of the spatial pattern can be better seen in FIG. 2B. In a digital system, the range between the maximum value (fmax) and the minimum value (fmin) may be mapped onto $2^n$ levels, with the maximum of the $2^n$ levels assigned the value ($f_n$max) and the minimum of the $2^n$ levels assigned the value ($f_n$min), and an analogue characteristic value may be assigned to one of the $2^n$ available values without loss of generality.

The second data bearing device 140A comprises a plurality of pattern defining elements and the pattern defining elements are distributed within an area in which the second data bearing device 140A is delineated.

So that data units of the first data bearing device 120 can be formed or defined by pixels of the spatial pattern 140A, the density of pixels defining the spatial pattern has to be substantially higher than the density of the data units forming the first data bearing device 120. For example, the spatial pattern of the second data bearing device 140A has 512×512 (262,144) pixels while the first data bearing device 120 can accommodate a maximum of 25×25 data units in the same area. In other words, each data unit is defined by more than 300 pixels or more.

The pattern defining elements are substantially more densely distributed than the data units 122 of the first data bearing device 120. For example, approximately 10 to 300 pattern defining elements can be present within a data unit 122 to define a dark data unit (D) or a light data unit (L).

Referring to FIG. 1, the overlapping region is rectangular and has a width equal to the sum of width of 12 data units and a height equal to the sum of height of 13 data units. While the area of the overlapping region is sufficient to accommodate a total of 156 data units in 13 rows and 12 columns, there is only a total of 131 data units distributed in the overlapping region as an area equal to 25 data units is occupied by the fourth alignment member. Of the 131 data units distributed in the overlapping region, 62 are light data units L and 69 are dark data units D.

The overlapping region comprises a light data region which is defined by the light data units and a dark data region which is defined by the light data units. The light data region is defined or formed by a first aggregate of pattern defining elements which are pattern defining elements of the spatial pattern 140A. The dark data region is defined or formed by a second aggregate of pattern defining elements which are pattern defining elements of the spatial pattern 140C.

Alternatively, the light data region may be defined or formed by a first aggregate of pattern defining elements which are pattern defining elements of the spatial pattern 140A, and the dark data region may be defined or formed by a second aggregate of pattern defining elements which are pattern defining elements of the spatial pattern 140B.

Alternatively, the light data region may be defined or formed by a first aggregate of pattern defining elements which are pattern defining elements of the spatial pattern 140B, and the dark data region may be defined or formed by a second aggregate of pattern defining elements which are pattern defining elements of the spatial pattern 140C.

A black data unit B, a white data units W, a dark data unit D, and a light data unit L may represent more than two different digital states. For example, a black data unit B may represent a first digital state, a dark data unit D may represent a second digital state, a light data unit L may represent a third digital state, and a white data unit W may represent a fourth digital state.

The spatial pattern 140A depicted in FIG. 3A is a data embedding pattern which is modified from the spatial pattern 140 while still covertly embedding the same data set F(u, v). In this spatial pattern 140A, the pattern defining elements have either a first value or a second value, the second value being higher than the first value. For example, the first value may be the minimum value ($f_n$min) and the second value may be the maximum value ($f_n$max). In this example, a 256 grey-level is adopted, with the colour black assigned the minimum value ($f_n$min) of 0 and the colour white assigned the maximum value ($f_n$max) of 255. The characteristic value of each of the 512×512 pixels of the spatial pattern can be one of the 256 ($2^8$) values between the minimum value ($f_n$min=0 in this example) and the maximum value ($f_n$max=255 in this example).

As depicted in FIG. 4A1, about 25% (66673/262144) of the pattern defining elements of the spatial pattern 140A are black bits and about 75% (195471/262144) of the pattern defining elements are white bits. Compared with the spatial pattern 140, the spatial pattern 140A is lighter in colour with better defined details and having a better or higher image resolution, as evident from a comparison between FIGS. 2B and 4A. As depicted in FIG. 4A1, the characteristic values of the pattern defining elements are concentrated near the two extremes ((fmin) and (fmax)) while those of the spatial pattern 140 are concentrated near the middle, with the characteristic values substantially following a normal-like or Gaussian-like distribution centred at about a mid-value between or a mean value of (($f_n$min) and ($f_n$max)).

To form the spatial pattern 140A, the characteristic expression f(x, y) is modified with the additional criteria that where the value of f(x, y) is at or above a dividing value, a maximum value ($f_n$max) will be assigned to that pixel, otherwise (that is, where the value of f(x, y) is below the dividing value), the minimum value ($f_n$min) will be assigned. A value of 104 has been selected as an example dividing value in this example to correspond to a count of about 25% black bits in this example. By selecting a dividing value as a dividing threshold, and then assigning one of two characteristics values to the pattern defining element, a sharper and crisper data embedding pattern is formed. While two characteristic values are present in the spatial pattern 140A, there is actually only one characteristic value since the other characteristic value would be that of the background. It should be appreciated that either one of the two characteristic values can be the value of the background and the other a pattern defining element without loss of generality. While the characteristic values provide a maximum contrast between the pattern defining elements and the background, it should be appreciated that other values that would provide adequate of sufficient contrast can be used without loss of generality.

A spatial pattern 140B depicted in FIG. 3B is identical to that of FIG. 3A except that a different dividing value of 124 has been used to obtain about 50% of black bits or 50% white bits.

A spatial pattern 140C depicted in FIG. 3C is identical to that of FIG. 3A except that a different dividing value of 146 has been used to obtain about 75% of black bits and 25% white bits. Due to the higher percentage of black bits in the spatial pattern 140C, the spatial pattern 140C appears darker than the spatial pattern 140 while having a superior pattern resolution and better resolution and image details.

In the examples of FIGS. 3A to 3C, black bits (level 0) are pattern defining elements on a white (level 255) background and the number of black bits represents the number of pattern defining elements and the percentage of black bit or the area occupied by the black bits would represent the density of pattern defining elements in the spatial pattern.

However, a data embedding pattern may have white bits (level 255) as pattern defining elements which are distributed or scattered on a black background. Where the background is black, the number of white bits represents the number of pattern defining elements and the percentage of white bits or area occupied by the white bits would represent the density of pattern defining elements in the spatial pattern.

The process of assigning one of two discrete values to the pixels with reference to the dividing value on generating the spatial pattern has the effect of digitising the values of the spatial distribution rule into one of only two digital states, compared to the original $2^n$ levels where n>1. With the digitization, a pixel is either a background element, a pattern defining element (or an information bearing element on the background), and this substantially enhances contrast between the information bearing elements and the background and enhances resolution of the spatial pattern. This digitisation process of converting the pixels into two contrasting states, is akin to a data quantization process, and is beneficial in improving the quality or resolution of the spatial pattern while the data embedding properties or the alter ego the spatial patterns is maintained or at least preserved. The dividing value is used herein as a 'selection threshold value'.

It is noted that the quality or resolution of the spatial pattern has improved by following the spatial distribution rule and using the selection process with reference to the 'selection threshold value' without using the two-state quantization process. In some embodiments, a data embedding pattern according to the disclosure is made by following the spatial distribution rule and using the selection process with reference to the 'selection threshold value' and without performing the two-state quantization process.

An example composite information bearing device 200 depicted in FIG. 5A comprises a first data bearing device and a second data bearing device which are in complete overlap. The first data bearing device is of the same type as the first data bearing device 120 and comprises two types of data units, namely, a dark data unit ("D") representing a first digital state and a light data unit ("L") representing a second and different digital state. The dark portion of the composite information bearing device 200 shown in FIG. 5A comprises dark data units which are defined by an aggregate of pattern defining elements having the same characteristics as those of the spatial pattern 1400. The light portion of the composite information bearing device 200 comprises lighter data units which are defined by an aggregate of pattern defining elements having the characteristics of those of the spatial pattern 140A.

In selecting pixels to form the dark data units of the first data bearing device, only pixels (or bits) having a characteristic value satisfying a selection criteria of having a density of about 75% of black pattern defining elements and/or at or below a selection threshold value of 146 are selected so that pixels having a value 146 or below are accepted as pattern defining elements while pixels having a value above 146 would form the background.

In selecting pixels to form the light data units of the first data bearing device, only pixels (or bits) having a characteristic value satisfying a selection criteria of having a density of about 25% of black pattern defining elements and/or below the selection threshold value of 104 are selected so that pixels having a value above 104 would form the background.

In determining whether a pixel is to be a pattern defining element or a background defining element, the characteristic values of all the pixels are determined by a computational device such as a microprocessor and a tabulation of pixel number versus characteristic values is made for selection reference. Table 1 below shows a tabulation of the characteristic values (expressed in 256 grayscale levels) and count of pixels (in %) constituting all the pixels of the example spatial pattern.

TABLE 1

| Pixel Grayscale | Cumulative Count | Cumulative Count in % |
| --- | --- | --- |
| 0 | 1 | 0.00038147% |
| ⋮ | ⋮ | ⋮ |
| 104 | 66673 | 25.433% |
| ⋮ | ⋮ | ⋮ |
| 125 | 131809 | 50.281% |
| ⋮ | ⋮ | ⋮ |
| 146 | 196943 | 75.127% |
| ⋮ | ⋮ | ⋮ |
| 255 | 262144 | 100% |

As depicted in Table 1, there are 0.00038147% of pixels having a grayscale of "0" (black), 25.433% of pixels having a grayscale level of 104 and below, 50.281% of pixels having a grayscale level of 125 and below, and 75.127% of pixels having a grayscale level of 146 and below. In another perspective, there are 0.001% of pixels having a grayscale of "255" (white), 74.567% of pixels having a grayscale level of above 104, 49.719% of pixels having a grayscale level of above 125, and 24.873% of pixels having a grayscale level of above 146.

The dark region 202 and the light region 204 of the composite information bearing device 200 are shown separately in FIGS. 5A1 and 5A2. The dark region 202 shown in FIG. 5A1 comprises dark data units and the dark portion of the alignment device. The dark data units are distributed to form a first aggregate of pattern defining elements to define a dark data region. The blank region in FIG. 5A1 is a region occupied by the light region in the composite information bearing device 200 of FIG. 5A but has been left blank in FIG. 5A1 to show only the dark data region. The light region 204 shown in FIG. 5A2 comprises light data units and the light portion of the alignment device. The light data units are distributed to form a second aggregate of pattern defining elements to define a light data region. The blank region in FIG. 5A2 is a region occupied by the dark region in the composite information bearing device 200 of FIG. 5A but has been left blank in FIG. 5A2 to show only the light data region. The composite information bearing device 200 of FIG. 5A is formed when the dark data region 202 of FIG. 5A1 and the light data region 204 are overlapped with the alignment devices aligned.

The discrete data F(u, v) is covertly embedded in the dark data portion comprising the aggregate of dark data units and can be recovered by performing reverse transform only on the dark data portion, even though the dark data portion is only a selected portion of or excerpted from the data embedding pattern 140C of FIG. 3C. Likewise, the discrete data F(u, v) is covertly embedded in the light data portion comprising the aggregate of light data units and can be recovered by performing reverse transform only on the light data portion, even though the light data portion is only a selected portion excerpted from the data embedding pattern 140A of FIG. 3A.

Furthermore, the discrete data F(u, v) is covertly embedded in the overall data portion of the composite information bearing device 200 comprising both the light data portion (the 'aggregate of light data units', the 'first data unit aggregate' or the 'first aggregate' in short) and the dark data portion (the 'aggregate of dark data units', the 'second data unit aggregate' or the 'second aggregate' in short) and can be recovered by performing reverse transform on the overall data portion, even though the data defining elements of the first aggregate and the second aggregate are selected using different selection criteria such as different density criteria and/or different selection threshold values.

While the light data portion of the example composite information bearing device 200 is constructed from the data embedding pattern of FIG. 3A and the dark data portion data is constructed from the data embedding pattern of FIG. 3C, it would be appreciated that the light and dark data portions can be constructed from different combinations of data embedding patterns according to the present disclosure. For example, the dark data portion may be constructed from the data embedding pattern of FIG. 3B and the light data portion may be constructed from the data embedding pattern of FIG. 3A. As an alternative example, the dark data portion may be constructed from the data embedding pattern of FIG. 3C while the light data portion may be constructed from the data embedding pattern of FIG. 3B.

In the examples of FIGS. 3A, 3B and 3C, a density of black pattern defining element of about 25% is selected to define light data units, a density of black (counterpart) pattern defining element of about 75% is selected to define dark data units, and a density of pattern defining element of about 50% can either define dark or light data regions. However, the density and the associated selection threshold values are useful example only.

In choosing selection criteria to form the dark data units and the light data units, a useful rule is that a light data unit should be sufficiently light in order to distinguish it from a dark data unit, a dark data unit should be sufficiently dark in order to distinguish it from a light data unit, and at the same time, the pattern defining elements must be readily identifiable or recoverable from background of the light or dark units in order to recover the embedded data.

As a useful rule, the light data region may form of black pattern defining elements and has a density of black pattern defining elements between 15% to 55%, the dark data region may be formed of black pattern defining elements and has a density of black pattern defining elements of between 45% to 85%, and a difference between the density of the black pattern defining elements forming the light data region and the density of the black pattern defining elements forming the dark data region of about 15% density or more would provide sufficient contrast, although a larger difference, for example 20%, 25%, or more in density term should further enhance contrast between the two data regions. For example, the density difference may be 15% or more, 20% or more, 25% or more, 30% or more, 35% or more, 40% or more, 45% or more, 50% or more, 55% or more, 60% or more, 65% or more, or 70% or less, or in a range defined by a combination of any of the numerical values.

The three types of data embedding patterns depicted in FIGS. 3A, 3B and 3C are representative of 3 types of data units. The first type of data units, as represented by the pattern of FIG. 3A, is the lightest of the three. The second type, as represented by the pattern of FIG. 3C, is the darkest of the three. The third type, as represented by the pattern of FIG. 3B, has an intermediate darkness or an intermediate lightness between that of FIGS. 3A and 3C.

In general, the first type of data units, that is, the lightest, would have a density of black pattern defining elements of 15% and above, for example, a density of 20% or more, 25% or more, 30% or more, 35% or more, 45% or more, 50% or more and 55% or more but below 85%. The second type of data units, that is, the darkest, would have a density of black pattern defining elements of 55% and above, for example, a density of 60% or more, 65% or more, 70% or more, 75% or more, 80% or more but usually not exceeding 85%. Where the data units of the first type and the second type are to represent two digital states, a combination of any of the aforesaid densities would be appropriate, provided there is an appropriate difference in the density of black pattern defining elements to provide sufficient contrast.

Where the three types of data units are to represent three different digital states, the third type of data units would need to have a density of pattern defining elements which is between the first type and the second type while maintaining an appropriate difference in the density of black pattern defining elements to provide sufficient contrast. As discussed herein, although a larger difference, for example 20%, 25% is preferred for data units having two digital states, a difference of between 15% and 20% is probably more suitable for data units having three or more digital states.

An example composite data bearing device 300 depicted in FIG. 5B comprises a first data bearing device and a second data bearing device which totally overlap. The first data bearing device is of the same type as the first data bearing device of the composite data bearing device 200 and comprises a dark data region which is formed of dark data units ("D") and forming an aggregate of dark data units, and a light data region formed of light data units ("L") and forming an aggregate of light data units. An example dark data unit 302 and an example light data unit 304 is depicted in FIG. 5B1. The alignment device is different to that of the composite data bearing device 200 and has only black and white portions. Apart from the difference in the alignment device, the description on the composite data bearing device 200 is applicable and is incorporated herein mutatis mutandis.

An example composite data bearing device 400 depicted in FIG. 5C comprises a first data bearing device and a second data bearing device. The first data bearing device is of the same type as the first data bearing device 120 of the composite data bearing device 100 and comprises two types of data units, namely, light data units ("L") and black data units ("B") which represent two different digital states. Pattern defining elements are scattered or distributed only in the light data region which is formed by an aggregate of all light data units in the device 400 and covertly embed the data F(u, v). The light data portion is an excerpt of the data embedding pattern of FIG. 3A or 3B. Pattern defining elements are not visible or apparent in the black data region.

Another example composite data bearing device similar to the composite data bearing device 400 (not shown) comprises a first data bearing device and a second data bearing device. The first data bearing device is of the same type as the first data bearing device 120 of the composite data bearing device 100 and comprises two types of data units (namely, dark data units ("D") and white data units ("W") which represent two different digital states. Pattern defining elements are scattered or distributed only in the dark data region which is formed by an aggregate of all dark data units in the device and covertly embed the data F(u, v). The dark data portion is an excerpt of the data embedding pattern of FIG. 3B or 3C.

An example composite data bearing device 500 depicted in FIG. 6 comprises a first data bearing device and a second data bearing device. The first data bearing device comprises three types of data units which are distributed in a matrix of 8 rows and 8 columns. Each of the data units has a square shape and all the three types of data units have the same size. The three types of data defined herein, namely, lightest, darkest, and intermediate, are to represent three different digital states. The data region of the first data bearing region are formed by a first data region defined by a first aggregate of data units of the first type, a second data region defined by a second aggregate of data units of the second type, and a third data region defined by a third aggregate of data units of the third type having the above selection criteria.

An example composite data bearing device 600 depicted in FIG. 7 comprises a first data bearing device and a second data bearing device. The first data bearing device comprises two types of data units, namely, the light data units and the dark data units, which are distributed in an one dimension array corresponding to the arrangement of a barcode. The light data units and the dark data units have the properties and selection criteria as those discussed herein.

In the above examples, the discrete data F(u, v) is covertly embedded, jointly and severally, in the dark data portion, the light data region, the intermediate data region (if present), and the overall data region comprising all the data regions present, even though the data portion is only a selected excerpt or a portion of the complete data embedding pattern.

When a composite data bearing device according to the present disclosure is printed on a medium, for example, as a printed matter, spreading due to imperfect printing is almost inevitable. For example, a composite data bearing device according to the present disclosure when printed will be subject to printing distortion and resulting in degraded quality, as depicted in FIGS. 8, 8A and 8B. The dark data region 702 depicted in FIG. 8A is the aggregate of dark data units separated from the composite data region 700, while the light data region 704 depicted in FIG. 8B is the aggregate of light data units separated from the composite data region 700. As depicted in FIGS. 8A1 and 8A2, the pixel distribution characteristics are also changed from those of FIGS. 4A1, 4B1 and 4C1 to that of FIGS. 8A1 and 8A2. It is noted from FIG. 8A1 that the peak of pixel distribution of the dark data region as depicted in FIG. 8A1 has been shifted upwards from 0 to a value (186) towards the maximum (255) and spread. Likewise, the peak of pixel distribution of the light data region as depicted in FIG. 8A2 has been shifted downwards from the maximum 255 to 202 and spread, although the peak of the pixel distribution of the light data region still has a higher level than that of the peak of the pixel distribution of the dark data region.

By selecting a restoration dividing value and processing the pixel distribution such that all pixels in the dark and light data regions are restored to have either the value 0 or 255 depending whether the pixel value is above the restoration dividing value, the dark and light data portion can be restored. In this example, a restoration dividing value of 202, mean of 186 and 217 is selected.

In another example, a composite data bearing device when printed is subject to printing distortion and resulting in degraded quality, as depicted in FIGS. 9, 9A and 9B. The dark data region 802 depicted in FIG. 9A is the aggregate of dark data units separated from the composite data region 800, while the light data region 804 depicted in FIG. 9B is the aggregate of light data units separated from the composite data region 800. As depicted in FIGS. 9A1 and 9A2, the pixel distribution characteristics are also changed from those of FIGS. 4A1, 4B1 and 4C1 to that of FIGS. 9A1 and 9A2. It is noted from both FIGS. 9A1 and 9A2 that there are two peaks of pixel distribution in each of the dark data region and the light data region.

By selecting a restoration dividing value and processing the pixel distribution such that all pixels in the dark and light data regions are restored to have either the value 0 or 255 depending whether the pixel value is above the restoration dividing value, the dark and light data portion can be restored. In this example, value (84) of the peak which is near the black level in the dark data region is taken as a reference dividing value for the composite data region 800 as the value can better represent the black level in the composite data region 800 region and value (228) of the peak which is near the white level in the light data region is taken as a reference dividing value for the composite data region 800 as the value can better represent the white level in the composite data region 800, and a restoration dividing value of 156, mean of 84 and 228 is selected to perform restoration.

While the disclosure has been made with reference to the examples herein, it should be understood that the examples are for reference and should not be used for restricting the scope of disclosure. For example, while the light and dark portions correspond to the same data transform function in the examples, the light and dark portions may correspond to different data transform functions without loss of generality.

The invention claimed is:

1. A composite information bearing device comprising a plurality of data units, the plurality of data units being arranged to define a first data bearing device representing a first set of data, wherein each of the data units is formed into one of a plurality of discrete states to represent one of a corresponding plurality of digital states including at least a first digital state and a second digital state, wherein at least some of the data units of one of the first digital state and/or the second digital state are defined by an ensemble of pattern defining elements, and the number of pattern defining elements forming the ensemble is substantially higher than the number of data units defined by the ensemble; wherein the pattern defining elements of the ensemble are distributed to form a first data embedding pattern, and the first data embedding pattern corresponds to a second set of data; wherein the second set of data correlates to a spread pattern which follows a spatial distribution rule, and the spatial distribution rule defines characteristic values of the spread pattern in spatial domain and have continuous values spread between a maximum value and a minimum value; and wherein spatial distribution of the pattern defining elements of the ensemble follows the spatial distribution rule to the extent where the characteristic values are either above or below a selection threshold value, the selection threshold value being a value between the maximum value and the minimum value.

2. The composite information bearing device according to claim 1, wherein at least a majority or all of the pattern defining elements of the ensemble has a characteristic value that is either at or near the maximum value or the minimum value.

3. The composite information bearing device according to claim 2, wherein at least a majority of the pattern defining elements of the ensemble has a characteristic value that is higher than its spatial distribution rule counterpart or at or near the maximum value where the characteristic value of the counterpart is between the selection threshold value and the maximum value.

4. The composite information bearing device according to claim 1, wherein at least a majority of the pattern defining elements of the ensemble has a characteristic value that is lower than its spatial distribution rule counterpart or at or near the minimum value where the characteristic value of the counterpart is between the selection threshold value and the minimum.

5. The composite information bearing device according to claim 1, wherein a plurality of data units of the first digital state is formed by a first aggregate of pattern defining elements, and the first aggregate has a first density of the pattern defining elements, the first density correlating to the selection threshold value of the pattern defining elements forming the first aggregate.

6. The composite information bearing device according to claim 5, wherein the first density is at or above 15%, at or above 20%, at or above 25%, at or above 30%, at or above 35%, at or above 40%, at or above 45%, at or above 50%, at or below 55%, or is in a range defined by a combination of any of the numerical values herein.

7. The composite information bearing device according to claim 5, wherein the plurality of digital states include a third digital state and a plurality of data units of the third digital state is formed by a third aggregate of pattern defining elements, and the third aggregate has a third density of the pattern defining elements, the third density being intermediate the first density and the second density and correlating to the selection threshold value of the pattern defining elements forming the third aggregate.

8. The composite information bearing device according to claim 7, wherein the third density differ with the first density and the second density by a density of between 15% and 30%, including between 15% and 20% and between 20% and 30%.

9. The composite information bearing device according to claim 1, wherein a plurality of data units of the second digital state is formed by a second aggregate of pattern defining elements, and the second aggregate has a second density of the pattern defining elements, the second density correlating to the selection threshold value of the pattern defining elements forming the second aggregate.

10. The composite information bearing device according to claim 9, wherein the second density is at or above 45%, at or above 50%, at or above 55%, at or above 60%, at or above 65%, at or above 70%, at or above 75%, at or above 80%, at or below 85%, or is in a range defined by a combination of any of the numerical values herein.

11. The composite information bearing device according to claim 10, wherein the first density and the second density differ by a density of 15% or more, 20% or more, 25% or more, 30% or more, 35% or more, 40% or more, 45% or more, 50% or more, 55% or more, 60% or more, 65% or more, 70% or more, or is in a range defined by a combination of any of the numerical values herein.

12. The composite information bearing device according to claim 1, wherein at least some of the data units of the first digital state are defined by a first aggregate of pattern defining elements and at least some of the data units of the second digital state are defined by a second aggregate of pattern defining elements, the ensemble comprising the first aggregate and the second aggregates; wherein the pattern defining elements of the first aggregate follow the spatial distribution rule where the characteristic value of the spatial distribution rule is above a first selection threshold value, and wherein the pattern defining elements of the second aggregate follow the spatial distribution rule where the characteristic value of the spatial distribution rule is above a second selection threshold value.

13. The composite information bearing device according to claim 12, wherein the plurality of digital states includes a third digital state and at least some of the data units of the third digital state are defined by a third aggregate of pattern defining elements; wherein the ensemble comprises the third aggregate and the pattern defining elements of the third aggregate follow the spatial distribution rule where the characteristic value of the spatial distribution rule is above a third selection threshold value; and wherein values of an adjacent pair of selection threshold values differ by at least 20%.

14. The composite information bearing device according to claim 1, wherein at least some of the data units of the first digital state are defined by a first aggregate of pattern defining elements and at least some of the data units of the second digital state are defined by a second aggregate of pattern defining elements, the ensemble comprising the first aggregate and the second aggregates; wherein the pattern defining elements of the first aggregate follow the spatial distribution rule where the characteristic value of the spatial distribution rule is below a first selection threshold value, and wherein the pattern defining elements of the second aggregate follow the spatial distribution rule where the characteristic value of the spatial distribution rule is below a second selection threshold value.

15. The composite information bearing device according to claim 14, wherein the plurality of digital states includes a third digital state and at least some of the data units of the third digital state are defined by a third aggregate of pattern defining elements; wherein the ensemble comprises the third aggregate and the pattern defining elements of the third aggregate follow the spatial distribution rule where the characteristic value of the spatial distribution rule is below a third selection threshold value.

16. The composite information bearing device according to claim 15, wherein the first aggregate has a first density of the pattern defining elements, the second aggregate has a second density of the pattern defining elements, and the third aggregate has a third density of the pattern defining elements; and wherein the third density is between the first density and the second density, and differs from both the first density and the second density by at least a density of 15%.

17. The composite information bearing device according to claim 1, wherein the data embedding pattern has a spatial repetition frequency of 175 LPI or higher, 250 LPI or higher, 300 LPI or higher, 350 LPI or higher, 400 LPI or higher, 450 LPI or higher, 500 LPI or higher, 550 LPI or higher, or 600 LPI or higher.

18. The composite information bearing device according to claim 1, wherein the data units have a spatial repetition frequency which is substantially lower than the spatial repetition frequency of the data embedding pattern, the spatial repetition frequency of the data units being at or near 35%, 30%, 25%, 20%, 10%, 5%, 1%, 0.1%, 0.05, 0.01% of the spatial repetition frequency of the data embedding pattern or lower.

19. A method of making a composite information bearing device, the composite information bearing device comprising a plurality of data units, the plurality of data units being arranged to define a first data bearing device representing a first set of data, wherein each of the data units is formed into one of a plurality of discrete states to represent one of a corresponding plurality of digital states including at least a first digital state and a second digital state, wherein at least some of the data units of one of the first digital state and/or the second digital state are defined by an ensemble of pattern defining elements, and the number of pattern defining elements forming the ensemble is substantially higher than the number of data units defined by the ensemble; wherein the pattern defining elements of the ensemble are distributed to form a first data embedding pattern, and the first data embedding pattern corresponds to a second set of data; wherein the second set of data correlates to a spread pattern which follows a spatial distribution rule, and the spatial distribution rule defines characteristic values of the spread pattern in spatial domain and have continuous values spread between a maximum value and a minimum value; and wherein spatial distribution of the pattern defining elements of the ensemble follows the spatial distribution rule to the extent where the characteristic values are either above or below a selection threshold value, the selection threshold value being a value between the maximum value and the minimum value; and wherein the method comprises selecting a spatial distribution rule, determining the selection threshold value, and printing the composite information bearing device by following the spatial distribution rule to the extent where the characteristic values are either above or below a selection threshold value.

20. A method of recovering data from a composite information bearing device having a plurality of pixels which is presented on a presentation medium, wherein the composite information bearing device comprises a plurality of data units, the plurality of data units being arranged to define a first data bearing device representing a first set of data; wherein each of the data units is formed into one of a plurality of discrete states to represent one of a corresponding plurality of digital states including at least a first digital state and a second digital state, wherein at least some of the data units of one of the first digital state and/or the second digital state are defined by an ensemble of pattern defining elements, and the number of pattern defining elements forming the ensemble is substantially higher than the number of data units defined by the ensemble; wherein the pattern defining elements of the ensemble are distributed to form a first data embedding pattern, and the first data embedding pattern corresponds to a second set of data; wherein the second set of data correlates to a spread pattern which follows a spatial distribution rule, and the spatial distribution rule defines characteristic values of the spread pattern in spatial domain and have continuous values spread between a maximum value and a minimum value; and wherein spatial distribution of the pattern defining elements of the ensemble follows the spatial distribution rule to the extent where the characteristic values are either above or below a selection threshold value, the selection threshold value being a value between the maximum value and the minimum value; and wherein the method comprises selecting a restoration dividing value and processing an aggregate of pattern defining elements which defines the data units of a digital state such that a pixel is assigned a maximum value if the pixel has a value above the restoration dividing value and assigned a minimum value otherwise.

* * * * *